(12) United States Patent
Seil et al.

(10) Patent No.: US 8,254,846 B2
(45) Date of Patent: Aug. 28, 2012

(54) CONNECTIVITY DEVICE AND METHOD OF PROVIDING SAME

(75) Inventors: Oliver Duncan Seil, Pasadena, CA (US); Kelly Ferdman, Los Angeles, CA (US); David Kleeman, Marina Del Rey, CA (US); Richard James Elgie, Irvine, CA (US); Vijendra Nalwad, Newbury Park, CA (US); Vannin Gale, Anaheim Hills, CA (US); Timothy Brewer, San Diego, CA (US)

(73) Assignee: Belkin International, Inc., Playa Vista, CA (US)

( * ) Notice: Subject to any disclaimer, the term of this patent is extended or adjusted under 35 U.S.C. 154(b) by 563 days.

(21) Appl. No.: 12/545,017

(22) Filed: Aug. 20, 2009

(65) Prior Publication Data

US 2010/0075609 A1  Mar. 25, 2010

Related U.S. Application Data

(63) Continuation-in-part of application No. 12/349,505, filed on Jan. 6, 2009, which is a continuation-in-part of application No. 11/842,921, filed on Aug. 21, 2007, now Pat. No. 7,930,004, which is a continuation of application No. 10/936,356, filed on Sep. 8, 2004, now Pat. No. 7,292,881, said application No. 12/349,505 is a continuation-in-part of application No. 11/248,762, filed on Oct. 11, 2005, now Pat. No. 7,734,256.

(51) Int. Cl.
*H04B 7/00* (2006.01)
(52) U.S. Cl. ............................ 455/66.1; 455/345
(58) Field of Classification Search ............ 455/66.1
See application file for complete search history.

(56) References Cited

U.S. PATENT DOCUMENTS

| D85,176 S | 9/1931 | Garretson |
| D244,360 S | 5/1977 | Van Kersen |

(Continued)

FOREIGN PATENT DOCUMENTS

WO  WO 2004 008649  1/2004

(Continued)

OTHER PUBLICATIONS

Search Report from PCT/US2010/046093, 15 pages. Nov. 4, 2010.

(Continued)

*Primary Examiner* — Temesgh Ghebretinsae
*Assistant Examiner* — David Bilodeau
(74) *Attorney, Agent, or Firm* — Bryan Cave LLP

(57) ABSTRACT

In some embodiments, a connectivity device is configured to provide electrical power to a first electrical device and facilitate communications between the first electrical device and at least one second electrical device. The connectivity device further is configured to couple to a cigarette lighter and an external electrical power source. The connectivity device can include: (a) a first removable cigarette lighter adapter having: (1) a first electrical output interface; and (2) a power interface configured to removably couple to the cigarette lighter; (b) a base module having: (1) at least one first interface; (2) a second interface configured to removably couple to the first electrical output interface of the first removable cigarette lighter adapter and configured to also couple to the external electrical power source; (3) a third interface configured to removably couple to the first electrical device; and (4) a first control configured to receive operational instructions for the first electrical device. Other embodiments are disclosed herein.

17 Claims, 12 Drawing Sheets

U.S. PATENT DOCUMENTS

| | | | | |
|---|---|---|---|---|
| D317,579 S | 6/1991 | Shalvi | | |
| 5,230,563 A | 7/1993 | Shalvi | | |
| D357,201 S | 4/1995 | Novack | | |
| 5,459,792 A | 10/1995 | Reichel et al. | | |
| 5,642,402 A * | 6/1997 | Vilmi et al. | ................ | 455/569.2 |
| D381,662 S | 7/1997 | Weissberg et al. | | |
| 5,769,369 A | 6/1998 | Meinel | | |
| 5,860,824 A | 1/1999 | Fan | | |
| 5,967,851 A | 10/1999 | Ozer et al. | | |
| 6,052,603 A | 4/2000 | Kinzalow et al. | | |
| 6,075,999 A | 6/2000 | Vilmi et al. | | |
| D435,580 S | 12/2000 | Grinkus | | |
| D462,022 S | 8/2002 | Luebke et al. | | |
| D463,990 S | 10/2002 | Wysocki | | |
| D473,207 S | 4/2003 | Tanio | | |
| 6,591,085 B1 | 7/2003 | Grady | | |
| D479,712 S | 9/2003 | Ng | | |
| D483,281 S | 12/2003 | Cobigo | | |
| D487,470 S | 3/2004 | Cobigo | | |
| D487,735 S | 3/2004 | Wu et al. | | |
| 6,728,375 B1 | 4/2004 | Palett et al. | | |
| D489,696 S | 5/2004 | Cho | | |
| D489,713 S | 5/2004 | Yusa | | |
| D495,665 S | 9/2004 | Stekelenburg | | |
| D496,638 S | 9/2004 | Deubler, Jr. | | |
| D496,639 S | 9/2004 | Deubler, Jr. | | |
| D498,219 S | 11/2004 | Hamann | | |
| D500,484 S | 1/2005 | Deguchi | | |
| 6,842,356 B2 | 1/2005 | Hsu | | |
| D506,989 S | 7/2005 | Seil et al. | | |
| D508,028 S | 8/2005 | Deubler, Jr. | | |
| 6,936,936 B2 * | 8/2005 | Fischer et al. | ................ | 307/151 |
| D510,046 S | 9/2005 | Li | | |
| D510,584 S | 10/2005 | Tierney | | |
| D515,058 S | 2/2006 | Boyd | | |
| D521,526 S | 5/2006 | Suckle et al. | | |
| D525,962 S | 8/2006 | Elson | | |
| D526,990 S | 8/2006 | Slevin et al. | | |
| D527,666 S | 9/2006 | Tal et al. | | |
| D547,223 S | 7/2007 | Tal et al. | | |
| D548,728 S | 8/2007 | Yoshiyama | | |
| D555,146 S | 11/2007 | Sandy | | |
| D561,703 S | 2/2008 | Shimokawa et al. | | |
| D561,730 S | 2/2008 | Deubler et al. | | |
| 7,338,328 B2 | 3/2008 | Krieger et al. | | |
| D572,230 S | 7/2008 | Neu et al. | | |
| D578,993 S | 10/2008 | Yamada et al. | | |
| D590,804 S | 4/2009 | Tkachuk | | |
| D593,062 S | 5/2009 | Lee et al. | | |
| D597,068 S | 7/2009 | Whang | | |
| D600,228 S | 9/2009 | Finney et al. | | |
| D609,683 S | 2/2010 | Li | | |
| 2001/0041590 A1 | 11/2001 | Silberfenig et al. | | |
| 2002/0029091 A1 | 3/2002 | Seno et al. | | |
| 2003/0211888 A1 | 11/2003 | Wolinsky | | |
| 2004/0224638 A1 | 11/2004 | Fadell et al. | | |
| 2004/0224717 A1 | 11/2004 | Hertzberg et al. | | |
| 2005/0054400 A1 * | 3/2005 | Seick et al. | ................ | 455/575.9 |
| 2005/0064917 A1 | 3/2005 | Peng et al. | | |
| 2005/0215285 A1 | 9/2005 | Lin | | |
| 2005/0245138 A1 * | 11/2005 | Fischer et al. | ................ | 439/638 |
| 2007/0053523 A1 | 3/2007 | Iuliis et al. | | |
| 2007/0054550 A1 | 3/2007 | Cuthbert et al. | | |
| 2007/0082701 A1 | 4/2007 | Seil et al. | | |
| 2008/0227426 A1 * | 9/2008 | Lin | ................ | 455/345 |

FOREIGN PATENT DOCUMENTS

| | | |
|---|---|---|
| WO | 2007009122 | 1/2007 |

OTHER PUBLICATIONS

Belkin Catalog, Mobile FM Transmitter, http://catalog.belkin.com/IWCatProductPage.process?Merchant_Id=1&Product_Id=158087. Dec. 3, 2003.

Griffin Technology, iTrip FM Transmitter for iPod; http://www.griffintechnology.com/products/itrip/index.html. Dec. 3, 2003.

Belkin Catalog, TuneCase Mobile FM Transmitter, http://catalog.belkin.com/IWCatProductPage.process?Merchand_Id=1&Product_Id=140984. Dec. 3, 2003.

FriendTech, iDea Travel Kit for the iPod and PSP; http://www.friendtech.com/pages/idea_travel_kit.htm. Jun. 15, 2006.

Belkin Catalog, TuneCast Mobile FM Transmitter, http://catalog.belkin.com/IWCatProductPage.process?Merchant_Id=&Section_Id=201526&pcount=&Product_Id=140984. Oct. 14, 2003.

Monster iCarPlay Wireless Plus; www.monstercable.com/productPagePring.asp?pin=260; retrieved from the internet on Feb. 17, 2005.

XtremeMac AirPlay FM Transmitter for iPod and iPod mini; www.xtrememac.com/adapters/airplay.shtml;retrieved from the internet on Feb. 17, 2005.

Griffin Technology iTrip FM Transmitter for iPod; www.griffintechnology.com/products/itrip/; retrieved from the internet on Feb. 17, 2005.

Belkin Auto Kit for iPod w/Dock Connector; www.catalog.belkin.comIWCatProductPage.process?Merchant_Id=201526&pcount=retrieved from the internet on Feb. 17, 2005.

* cited by examiner

CONNECTIVITY DEVICE AND METHOD OF PROVIDING SAME

CROSS-REFERENCE TO RELATED APPLICATIONS

This application is a continuation-in-part of U.S. patent application Ser. No. 12/349,505, filed Jan. 6, 2009, which is a continuation-in-part of U.S. patent application Ser. No. 11/842,921, filed Aug. 21, 2007, which is a continuation of U.S. Pat. No. 7,292,881, filed Sep. 8, 2004. U.S. patent application Ser. No. 12/349,505 is also a continuation-in-part application of U.S. patent application Ser. No. 11/248,762, filed Oct. 11, 2005. U.S. Pat. No. 7,292,881 and U.S. patent application Ser. Nos. 11/248,762, 11/842,921, and 12/349,505 are incorporated herein by reference.

FIELD OF THE INVENTION

This invention relates generally to connectivity devices, and relates more particularly to connectivity devices for transmitting electrical power and/or data signals and methods of providing the same.

DESCRIPTION OF THE BACKGROUND

Numerous types of electrical devices are portable, such as, for example, cellular (or mobile) telephones, laptop computers, audio playback devices. AM (amplitude modulated) and FM (frequency modulated) radios, CD (compact disk) players, and media (e.g., MP3 (MPEG Audio Layer-3)) players. The terms "electrical device" and "media device" should be broadly understood and include electrical devices of all types and designs (e.g., media players, telephones, audio-visual media players, and devices incorporating media players, telephones, and/or audio-visual devices).

There are many portable electrical devices available, including those manufactured by Sony Corp., Philips Corp., Audiovox Corp., Microsoft Corp. (e.g., the Zune™ MP3 player), and Apple Computer, Inc. (e.g., iPod® MP3 player and iPhone™ device). These electrical devices rely on batteries for their portability, and battery life is sometimes a problem. After a few hours of usage, most of these electrical devices need an alternate power source, need to be charged, and/or need to have their batteries replaced. Many existing connectivity devices or electrical accessories exist to provide electrical power. The connectivity devices or electrical accessories, however, lack versatility in terms of the sources of electrical power with which they are compatible. This lack of versatility limits the usefulness of these electrical accessories.

Accordingly, a need exists for a connectivity device or electrical accessory configured to interface with an electrical device in a way that overcomes the limitations of existing devices.

BRIEF DESCRIPTION OF THE DRAWINGS

To facilitate further description of the embodiments, the following drawings are provided in which.

Figure 1:
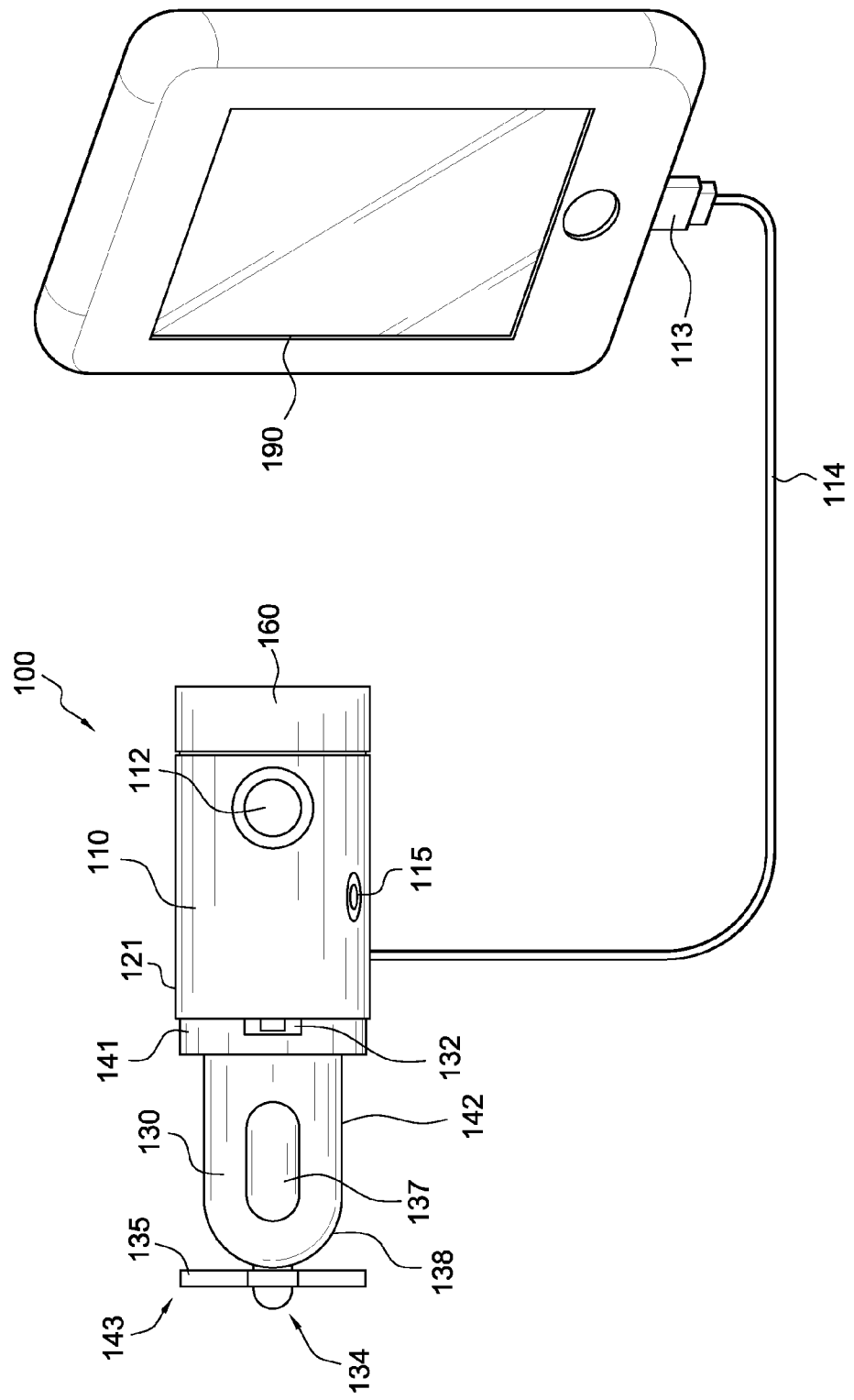
FIG. 1 illustrates an isometric view of a connectivity device removably coupled to an electrical device, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top." "bottom," "over," "under," and the like in the description and in the claims, if any, are used for descriptive purposes and not necessarily for describing permanent relative positions. It is to be understood that the terms so used are interchangeable under appropriate circumstances such that the embodiments of, the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of a connectivity device being coupled to an electrical device does not mean that the connectivity device cannot be removed (readily or otherwise) from, or that it is permanently connected to, the electrical device.

DETAILED DESCRIPTION OF EXAMPLES OF EMBODIMENTS

In a number of embodiments, a connectivity device is configured to provide electrical power to a first electrical device and facilitate communications between the first electrical device and at least one second electrical device. The connectivity device further is configured to couple to a cigarette lighter and an external electrical power source. The connectivity device can include: (a) a first removable cigarette lighter adapter having: (1) a first electrical output interface; and (2) a power interface configured to removably couple to the cigarette lighter; (b) a base module having: (1) at least one first interface; (2) a second interface configured to removably couple to the first electrical output interface of the first removably cigarette lighter adapter and configured to also couple to the external electrical power source; (3) a third interface configured to removably couple to the first electrical device; and (4) a first control configured to receive operational instructions for the first electrical device. The base module can be configured to provide the operational instructions and the electrical power to the first electrical device through the third interface.

In other embodiments, a power acquisition apparatus is configured to provide power to an electrical device. The power acquisition apparatus can include: (a) a first removable cigarette lighter adapter having: (1) a universal serial bus connector; and (2) a cigarette lighter coupling electrically coupled to the universal serial bus connector and configured to couple to a cigarette lighter; and (b) a base unit configured to couple to the first removable cigarette lighter adapter and having a universal serial bus connector configured to couple to the universal serial bus connector of the first removable cigarette lighter adapter. The base unit can be configured to provide electrical power to the electrical device. The base unit can be further configured to receive the electrical power from the cigarette lighter when the universal serial bus connector of the first removable cigarette lighter adapter is coupled to the universal serial bus connector of the base unit and the cigarette lighter coupling of the first removable cigarette lighter adapter is coupled to the cigarette lighter. The base unit also can be configured to receive the electrical power from an external electrical power source when the universal serial bus connector of the base unit is coupled to the external electrical power source.

In yet another embodiment, an electrical accessory can be configured to transmit first data signals and electrical power to a first electrical device. The electrical accessory can include: (a) a cigarette lighter module having: (1) a first universal serial bus connector; (2) a power receiving interface configured to couple to a cigarette lighter and receive the electrical power from the cigarette lighter; and (3) at least one second universal serial bus connector; and (b) a base module removably coupleable to the cigarette lighter module and having: (1) a universal serial bus connector configured to couple to the first universal serial bus connector of the cigarette lighter module; (2) a first electrical interface configured to couple to the first electrical device; (3) at least one second electrical interface; (4) a first microphone electrically coupled to the first electrical interface and configured to receive sounds and convert the sounds into the first data signals; and (5) electrical device controls for at least partially operating the first electrical device. The base module can be configured to provide the electrical power to the first electrical device that the base module receives from the cigarette lighter module when the first universal serial bus connector of the cigarette lighter module is coupled to the universal serial bus connector of the base module, when the power receiving interface of the cigarette lighter module is coupled to the cigarette lighter, and when the first electrical interface of the base module is couple to the first electrical device. The base module also can be configured to provide the electrical power to the first electrical device that the base module receives from an external electrical power source when the universal serial bus connector of the base module is coupled to the external electrical power source.

Embodiments can disclose a method of providing a connectivity device for interfacing with an electrical device. The method can include: (a) providing a first body; (b) providing a first electrical interface; (c) providing a power interface configured to removably couple to a cigarette lighter; (d) electrically coupling the first electrical interface to the power interface; (e) mounting the first electrical interface and the power interface to the first body; (f) providing a second body; (g) providing a second electrical interface configured to removably couple to the first electrical interface and configured to also removably couple to an external electrical power source; (h) providing a third electrical interface configured to removably couple to the electrical device; (i) providing a first control configured to receive operational instructions for the electrical device; (j) electrically coupling the second electrical interface to the third electrical interface; (k) electrically coupling the first control to the third electrical interface; and (l) mounting the second electrical interface, the third electrical interface, and the first control to the second body such that the second body is removably coupleable to the first body when the second electrical interface is coupled to the first electrical interface.

Figure 2:
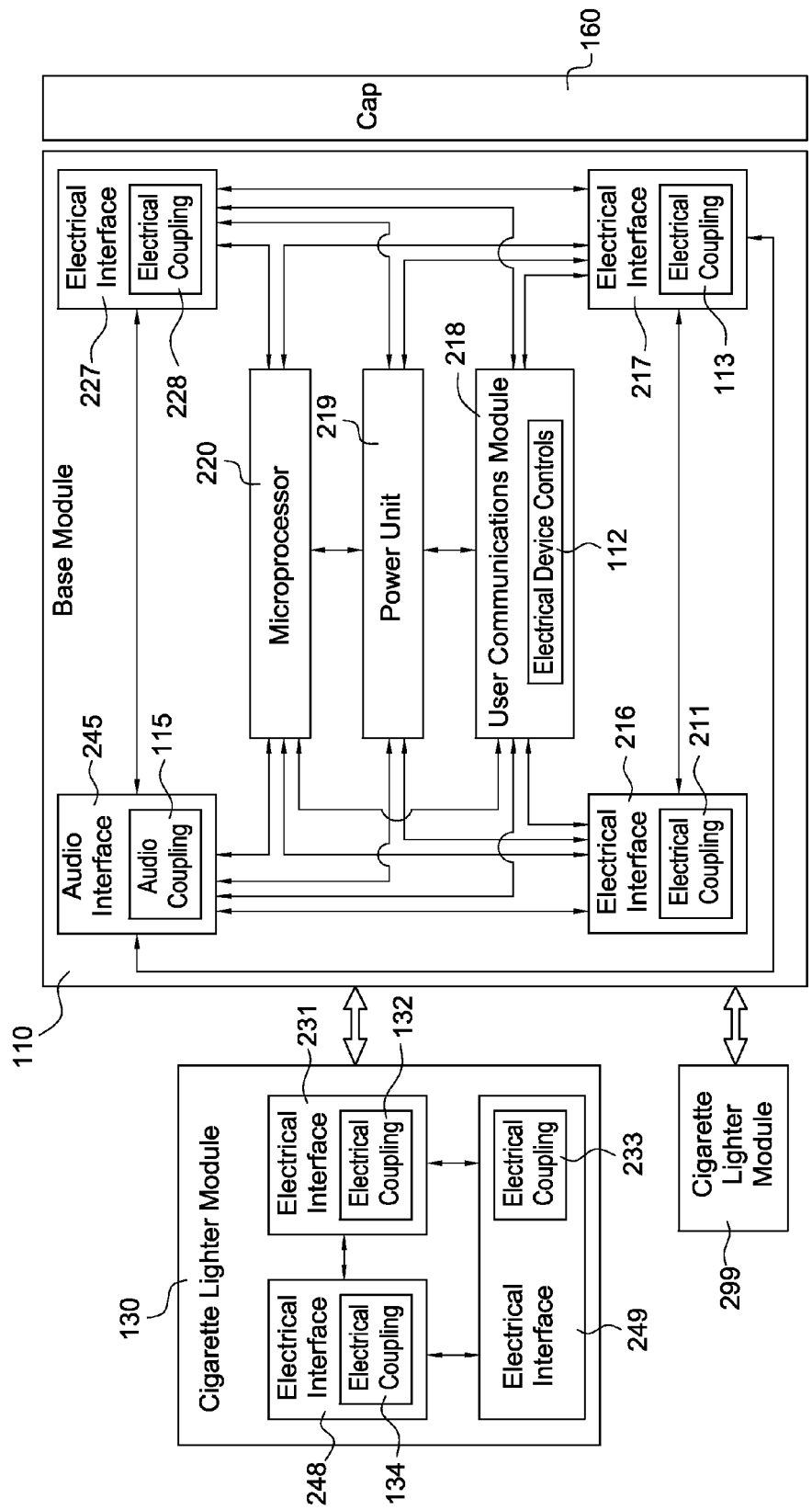
FIG. 2 illustrates a block diagram of the connectivity device of FIG. 1, according to the first embodiment.
Figure 3:
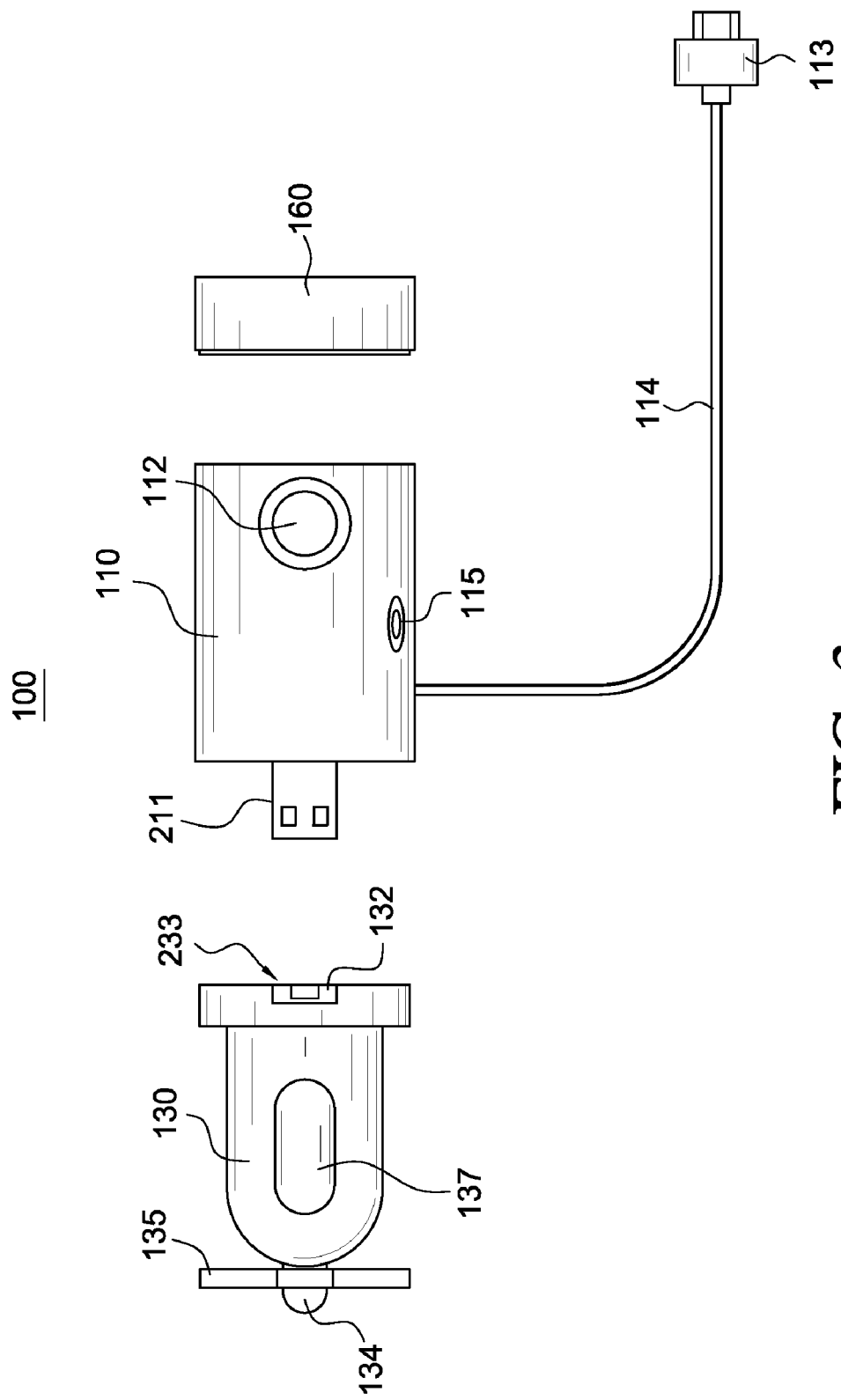
FIG. 3 illustrates a partially exploded side view of the connectivity device of FIG. 1, according to the first embodiment.

Turning to the drawings, FIG. 1 illustrates an isometric view of a connectivity device 100 removably coupled to an electrical device 190, according to a first embodiment. FIG. 2 illustrates a block diagram of connectivity device 100, according to the first embodiment. FIG. 3 illustrates a partially exploded side view of connectivity device 100, according to the first embodiment In some examples, connectivity device 100 can be configured to provide electrical power to electrical device 190. In the same or different example, connectivity device 100 can be configured to transmit data signals and electrical power to electrical device 190. Connectivity device 100 is merely exemplary and is not limited to the embodiments presented herein. Connectivity device 100 can be employed in many different embodiments or examples not specifically depicted or described herein.

In some embodiments, electrical device 190 is an electrical device configured to produce and receive electrical signals. For example, electrical device 190 can be a cellular (or mobile) phone, a laptop computer, an audio playback device, a portable AM (amplitude modulated) and FM (frequency modulated) radio, a satellite radio, a portable CD (compact disk) player, a data storage device, an audio player, an audio-visual player, and/or a portable media (e.g., MP3) player. The term "electrical device 190" includes electrical devices of all types and designs, including, but not limited to any of the types of devices described above and/or any combination thereof. For example, electrical device 190 could be an iPhone™ device, manufactured by Apple Computers, Inc. of Cupertino, Calif. The iPhone™ device includes an MP3 player, an audio-visual player, and a cellular telephone.

As illustrated in FIGS. 1-3, electrical accessory, power acquisition apparatus, and/or connectivity device 100 can include: (a) base module 110; (b) a removable cigarette lighter adapter or a removable cigarette lighter module 130; and (c) cap 160. Cigarette lighter module 130 is removably coupled to base module 110. Base module 110 is configured to receive electrical power from cigarette lighter module 130 when removable cigarette lighter module 130 is coupled to base module 110 and cigarette lighter module 130 is coupled to a cigarette lighter (not shown). Base module 110 is further configured to be coupled to and receive electrical power from an external power source (not shown), other than cigarette lighter module 130, when base module 110 is not coupled to cigarette lighter module 130. In another embodiment, base module 110 is further configured to be coupled to and receive power from the external power source regardless of whether base module 110 is coupled to cigarette lighter module 130.

Cap 160 can be configured to be removably coupled to base module 110. As will be described below, one of the advantages of embodiments of the connectivity device described in this application is their modularity. That is, different modules can be coupled together to fit the needs of the user of the connectivity device. In this first embodiment, base module 110 is coupled to cap 160, which has no functionality beyond capping an electrical interface 217 (FIG. 2). In other embodiments described below, cap 160 can be replaced with a transmitter module 551, (FIG. 5) transmitter module 751 (FIG. 7), or a display module (not shown).

In some examples, cigarette lighter module 130 is configured to couple to a cigarette lighter of a vehicle. That is, cigarette lighter module 130 includes a cigarette lighter adapter (e.g., electrical coupling 134). The term "cigarette lighter" is to be broadly understood and includes any power source that is capable of lighting cigarettes. Similarly, the term "cigarette lighter adapter" is to be broadly understood and includes any member, device, etc. at least a part of which mechanically mates with or fits into a "cigarette lighter" and can draw electrical power from it.

Base module 110 can include: (a) an electrical interface 216 (FIG. 2) with an electrical coupling 211 (FIGS. 2 and 3); (b) a user communications module 218 (FIG. 2) with one or more electrical device controls 112; (c) electrical interface 217 (FIG. 2) with an electrical coupling 113; (d) an audio interface 245 (FIG. 2) with an audio coupling 115; (e) a power unit 219 (FIG. 2); (f) a microprocessor 220 (FIG. 2); (g) an electrical interface 227 (FIG. 2) with an electrical coupling 228 (FIG. 2); and (h) a body 121. Body 121 can include an interior cavity (not shown). This interior cavity can house a portion of the electronic circuitry necessary to operate base module 110. In some examples, at least a portion of audio interface 245, electrical interface 216, electrical interface 217, user communications module 218, power unit 219, microprocessor 220, and electrical interface 227 are located in the interior cavity of body 121.

Cigarette lighter module 130 can include: (a) an electrical interface 231 (FIG. 2) with an electrical coupling 132; (b) an electrical interface 248 (FIG. 2) with an electrical coupling 134; (c) an electrical interface 249 (FIG. 2) with an electrical coupling 233 (FIG. 2); (d) a body 138; (e) stabilizing springs 137; and (f) a stabilizer 135 located at body 138.

Electrical interface 216 can include electrical coupling 211 and the electronic circuitry (if any) necessary to electrically couple to and communicate with cigarette lighter module 130 through electrical coupling 233. In some examples, electrical interface 216 can be configured to receive electrical power from cigarette lighter module 130 via electrical interface 249. In other embodiments, electrical interface 216 can be configured to receive and/or send electrical power to cigarette lighter module 130. In still additional embodiments, electrical interface 216 can be configured to send and/or receive data signals and/or power signals from electrical interface 249.

In addition to being able to couple to cigarette lighter module 130, electrical interface 216 can be configured to couple to external power sources (not shown) when not coupled to cigarette lighter module 130. Designing electrical interface 216 to be coupleable to cigarette lighter module 130 and other external power sources provides the user of connectivity device 100 flexibility and versatility not found in existing connectivity devices. In some examples, electrical coupling 211 can be a universal serial bus connector. In the same or different embodiments, electrical coupling 211 can be a male universal serial bus connector, and electrical coupling 233 can be a female universal serial bus connector.

Electrical interface 217 can include electrical coupling 113 and the electronic circuitry (if any) necessary to electrically couple to and communicate with electrical device 190. In some examples, electrical interface 217 can be configured to receive and/or send electrical power to electrical device 190. In additional embodiments, electrical interface 217 can be configured to send and/or receive data signals from electrical device 190. In still further examples, electrical interface 217 can be configured to receive and/or send electrical power and data signal to electrical device 190.

In some examples, electrical coupling 113 can be electrically and physically coupled to the rest of base module 110 by a wire 114. In one example, electrical coupling 113 can include a power coupling and a signal coupling. The power coupling and the signal coupling can each be one or more pins in electrical coupling 113. For example, electrical coupling 113 can be a thirty-pin male connector configured to mechanically and electrically couple to a thirty-pin female connector (not shown) on electrical device 190.

Electrical interface 227 can include electrical coupling 228 and the electronic circuitry (if any) necessary to electrically couple to and communicate with other modules of a connectivity device (e.g., transmitter module 551 (FIG. 5) or transmitter module 751 (FIG. 7)) not included in connectivity device 100. In the present embodiment, electrical interface 227 is not used but is included in connectivity device 100 for modularity or expansion purposes. In other examples, connectivity device 100 does not include electrical interface 227.

User communications module 218 can include one or more electrical device controls 112 and any electronic circuitry (if any) necessary to communicate with other elements of connectivity device 100. Electrical device controls 112 are configured to at least partially control electrical device 190. For example, electrical device controls 112 can be used to begin and end a telephone call when electrical device 190 includes a cellular telephone. Electrical device controls 112 can also be used to play, pause, fast forward, and rewind when electrical device 190 is configured to play music or other audio when electrical device 190 includes a media device.

In some examples, electrical device controls 112 can be implemented with one or more buttons. For examples, electrical device controls 112 can include a play/pause button, a stop button, a forward button, a back button, an answer/hang-up button, etc. Although pushbuttons are shown in FIGS. 1 and 3, any type of button can be used, and the term "button" should be broadly understood to refer to any type of mechanism (with or without moving parts) whereby the user can input to connectivity device 100 his or her data (for example, selection of a audio track). e.g., a mechanical pushbutton or switch, an electrostatic pushbutton or switch, an electrostatic array, or any other input device of any type. In other examples, user communications module 218 can include a display (not shown) used to display information about connectivity device 100 and/or electrical device 190.

In some examples, power unit 219 can be configured to receive electrical power from electrical interface 216 and provide electrical power to one or more of audio interface 245, electrical interface 217, electrical interface 227, user communications module 218, and microprocessor 220. In other examples, power unit 219 can receive electrical power from electrical interface 217 and/or a local power source (e.g., a battery) and provide electrical power to one or more of audio interface 245, electrical interface 216, electrical interface 227, user communications module 218, and microprocessor 220.

Audio interface 245 can include at least one audio coupling 115 and the electronic circuitry (if any) necessary for audio coupling 115. In some examples, an external microphone or other external audio input device can be coupled to audio interface 245 to provide data signals to electrical device 190 (via electrical coupling 113). In some examples, the external audio input device can be used to provide data signals to electrical device 190 instead of or in addition to microphone 425. In various embodiments, audio coupling 115 can include a female TRS (Tip, Ring. Sleeve) connector (e.g., a 2.5 millimeter (mm) or 3.5 mm female TRS connector).

In some embodiments, portions of electrical interface 216, electrical interface 217, electrical interface 227, user communications module 218, and power unit 219 can include and/or be controlled by microprocessor 220. As an example, microprocessor 220 can be a microprocessor no. C8051T611-GM, manufactured by Silicon Laboratories, Inc. of Austin, Tex. or microcontroller no. ST72F264G2H1, manufactured by Singapore Technologies of Singapore.

Turning to the elements of cigarette lighter module 130, electrical interface 231 can include electrical coupling 132 and the electronic circuitry (if any) necessary to electrically couple to and communicate with a second electrical device (not shown). In some examples, electrical coupling 132 can be configured to provide electrical power to the second electrical device. In other examples, electrical coupling 132 is configured to receive electrical power from the second electrical device. In other embodiments, electrical coupling 132 is configured to receive and/or send electrical power to the second electrical device. In still additional embodiments, electrical coupling 132 is configured to send and/or receive data signals and/or power signals from the second electrical device. In some examples, electrical coupling 132 can be a universal serial bus connector.

Electrical interface 248 can include electrical coupling 134 and the electronic circuitry (if any) necessary to electrically couple to and receive electrical power from a cigarette lighter. In some examples, electrical coupling 134 can be a cigarette lighter adapter configured to receive electrical power from a cigarette lighter (not shown).

Electrical interface 249 can include electrical coupling 233 and the electronic circuitry (if any) necessary to electrically couple to and communicate with electrical device 190. As previously discussed electrical coupling 233 can be configured to couple to electrical coupling 211.

Body 138 can include: (a) an end portion 141; (b) a middle portion 142; and (c) an end portion 143. Electrical couplings 132 and 233 can be located at end portion 141 in some examples. In other examples, electrical coupling 132 can be located at middle portion 142 or end portion 143.

Electrical coupling 134 can be located at end portion 143. In other examples, electrical coupling 132 and/or 233 can be coupled to end portion 143 or middle portion 142. In some examples, end portion 141 has a larger diameter than middle portion 142, and middle portion 142 has a larger diameter than end portion 143.

In numerous embodiments, an internal cavity (not shown) exists inside of body 138. This internal cavity can contain the electrical circuitry for obtaining power from an external power source such as a cigarette lighter and then processing the electrical power (e.g., the circuitry for electrical interfaces 231, 248, and/or 249). Although cigarette lighter module 130 is preferably removably coupleable to an external power source (e.g., cigarette lighter), cigarette lighter module 130 can in some cases be permanently affixed to the external power source. For example, a driver of a vehicle who does not smoke may obtain connectivity device 100 and hard-wire at least a portion of it into the cigarette lighter of the vehicle.

End portion 143 can be configured to be inserted into an external power source such as the cigarette lighter of a vehicle, which is usually a cylindrical cavity. To help position and stabilize cigarette lighter module 130 in such a cavity, non-conductive stabilizing springs 137 are provided on opposite sides of body 138.

Because stabilizing springs 137 may be insufficient to stabilize connectivity device 100 in all of the various size cigarette lighters that are found in vehicles, and particularly because of the cantilevered weight of connectivity device 100, stabilizer 135 can be used. Stabilizer 135 can include a deformable resilient member that is larger than the inner circumference of essentially all known vehicle cigarette lighters so that pushing end portion 143 into the cigarette lighter causes the outer circumference of the deformable resilient member to bend away from the distal end of end portion 143 (i.e., the part of end portion farthest from middle portion 142) and towards the proximal end of end portion 143 (the part of end portion 143 closest to middle portion 142) while at least some of the deformable resilient member even after such deformation continues to push against the inner circumference of the cigarette lighter.

Stabilizer 135 allows cigarette lighter module 130 to fit in the cigarette lighter of virtually any vehicle to mechanically and electrically semi-permanently (i.e., firmly but removably) couple connectivity device 100 to the cigarette lighter and to keep cigarette lighter module 130 in the desired position and maintain good electrical contact with the cigarette lighter. Stabilizer 135 retards or prevents undesired rotation, wobbling, and longitudinal movement of connectivity device 100 in the cigarette lighter. Thus, stabilizer 135 tends to prevent normal vibration, centrifugal forces (from the vehicle's turning), and bumps in the road from moving or rotating connectivity device 100 from its desired position.

In some examples, connectivity device 100 can include a cigarette lighter module 299. In various embodiments, cigarette lighter module 299 is the same or similar to cigarette lighter module 130. In some examples, base module 110 can couple to either cigarette lighter module 130 or cigarette lighter module 299 at a time. In various embodiments, cigarette lighter module 130 can be configured to provide electrical power with a first current (e.g., 1.2 Amperes (A)). In the same embodiment, cigarette lighter module 299 can be configured to provide electrical power with a second current (e.g., 0.2 A). Furthermore, in some examples, cigarette lighter module 299 can include four or more electrical interfaces (not shown). In the same or different example, cigarette lighter module 299 can include two female universal serial bus (USB) connectors, one male USB connector, and a cigarette lighter adapter.

The combination of the elements of connectivity device 100 provides synergistic advantages to the manufacturers and customers that are not available in other electrical devices. For example, the combination and interaction of cigarette lighter module 130 and electrical interface 216 provides multiple convenient mechanisms to receive electrical power for connectivity device 100 and/or electrical device 190.

Figure 4:
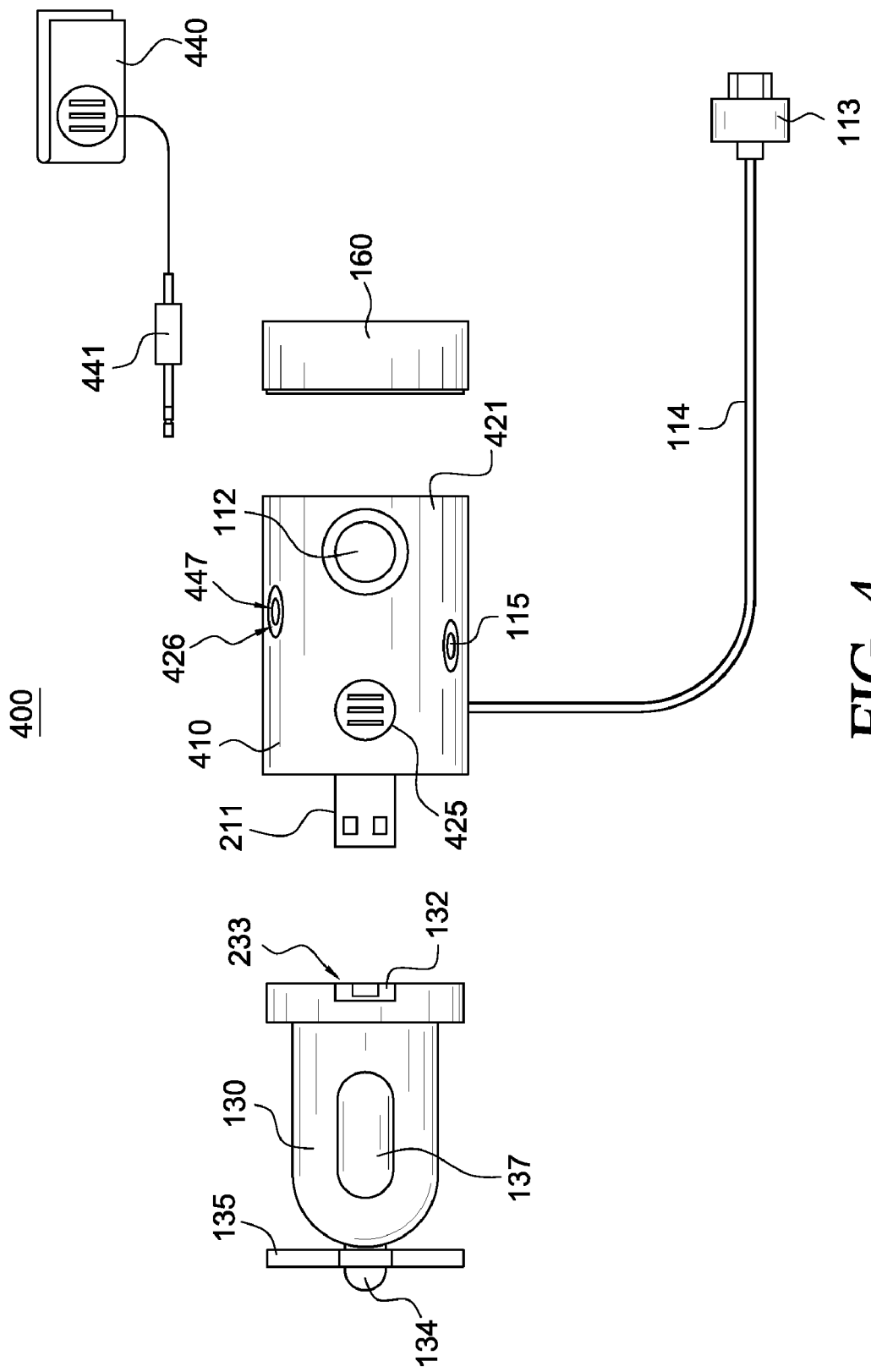
FIG. 4 illustrates a partially exploded side view of a connectivity device, according to a second embodiment.

FIG. 4 illustrates a partially exploded side view of connectivity device 100, according to a second embodiment. As illustrated in FIG. 4, connectivity device 400 can include: (a) a base module 410; (b) a removable cigarette lighter adapter or a removable cigarette lighter module 130; and (c) cap 160.

Base module 410 can include: (a) electrical interface 216 (FIG. 2) with electrical coupling 211; (b) user communications module 218 (FIG. 2) with electrical device controls 112; (c) electrical interface 217 (FIG. 2) with electrical coupling 113; (d) audio interface 245 (FIG. 2) with audio coupling 115; (e) power unit 219 (FIG. 2); (f) microprocessor 220 (FIG. 2); (g) electrical interface 227 (FIG. 2) with electrical coupling 228; (h) a body 421; (i) a microphone 425; and (j) an audio interface 426 with an audio coupling 447. Body 421 can include an interior cavity (not shown). This interior cavity can house a portion of the electronic circuitry necessary to operate base module 410. In some examples, at least a portion of audio interface 245, electrical interface 216, electrical interface 217, user communications module 218, electrical interface 227, power unit 219, microphone 425, audio interface 426, and/or microprocessor 220 are located in the interior cavity of body 421.

Microphone 425 can be electrically coupled to electrical interface 217 (FIG. 2) and/or electrical interface 227 (FIG. 2). Microphone 425 can receive sounds and convert the sounds into data signals and be configured to provide data signals to electrical interface 217 and/or electrical interface 227.

In some examples, audio coupling 447 can include a microphone input port or audio input connector. In some examples, an external microphone or other external audio input device 440 can be coupled to audio interface 426 to provide data signals to electrical device 190. In some examples, external audio input device 440 (via audio connector 441) can be used to provide data signals to electrical device 190 instead of or in addition to microphone 425. In various embodiments, audio interface 426 can include a female TRS connector (e.g. a 2.5 mm or 3.5 mm female TRS connector). In other examples, external audio input device 440 can be permanently coupled to base module 410. In some examples, external audio input device 440 can be a microphone attachable to a user's clothing.

Figure 5:
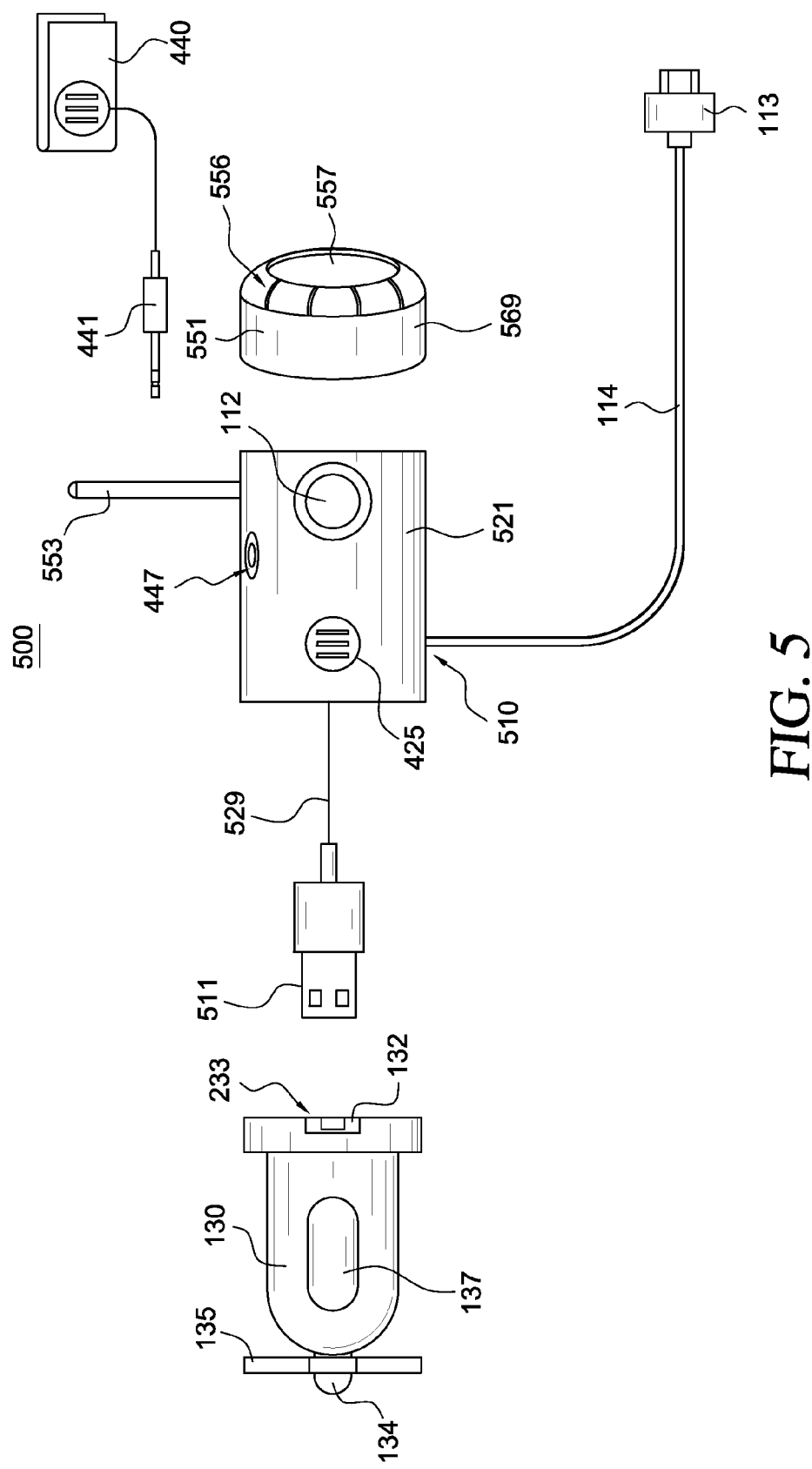
FIG. 5 illustrates a partially exploded side view of a connectivity device, according to a third embodiment.
Figure 6:
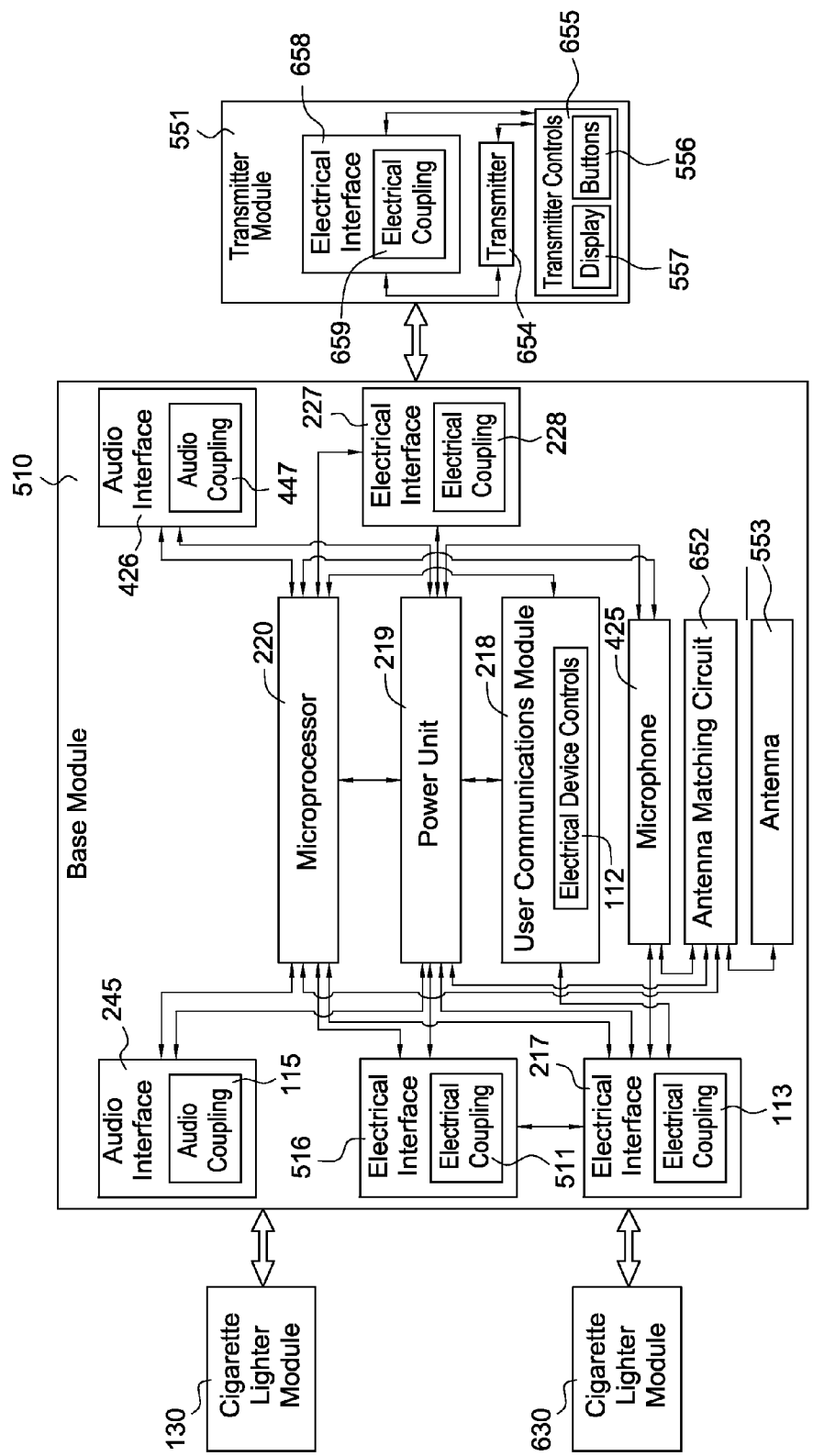
FIG. 6 illustrates a block diagram of the connectivity device of FIG. 5, according to the third embodiment.

Turning to yet another embodiment, FIG. 5 illustrates a partially exploded side view of connectivity device 500, according to a third embodiment. FIG. 6 illustrates a block diagram of connectivity device 500, according to the third embodiment.

As illustrated in FIGS. 5 and 6, connectivity device 500 can includes: (a) a base module 510; (b) one or more removable cigarette lighter adapter or a removable cigarette lighter modules 130 and 630; and (c) a transmitter module 551 with a body 569. Cigarette lighter module 130 can be removably coupled to base module 510 similar to the removable coupleability of base module 110 (FIG. 1) and cigarette lighter module 130.

In some examples, cigarette lighter modules 530 can be similar to cigarette lighter module 130 except cigarette lighter modules 530 can be configured to provide electrical power with a different current than the current provided by cigarette lighter module 130. For example, cigarette lighter module 130 can provide electrical power with a first current (e.g., 1.2 A). In the same embodiment, cigarette lighter module 630 can be configured to provide electrical power with a second current (e.g., 0.2 A). In same or different examples, other features of cigarette lighter modules 530 can be different than cigarette lighter modules 130 (e.g., the number of electrical couplings).

Base module 510 can include: (a) electrical interface 516 (FIG. 6) with electrical coupling 511; (b) user communications module 218 (FIG. 6) with electrical device controls 112; (c) electrical interface 217 (FIG. 6) with electrical coupling 113; (d) audio interface 245 with audio coupling 115; (e) power unit 219 (FIG. 6); (f) microprocessor 220 (FIG. 6); (g) electrical interface 227 (FIG. 6) with electrical coupling 228 (FIG. 6); (h) a body 521; (i) microphone 425; (j) audio interface 426 with audio coupling 447; (k) an antenna matching circuit 652; and (l) an antenna 553.

Body 521 can include an interior cavity (not shown). This interior cavity can house a portion of the electronic circuitry necessary to operate base module 510. In some examples, at least a portion of audio interface 245, electrical interface 516, electrical interface 217, user communications module 218, power unit 219, microprocessor 220, microphone 425, electrical interface 227, audio interface 426, antenna matching circuit 652, and antenna 553 are located in the interior cavity of body 521. In some examples, electrical coupling 511 can be electrically and physically coupled to base module 510 by a wire 529.

As illustrated in FIG. 6, transmitter module 551 can include: (a) a transmitter 654; (b) transmitter controls 655; and (c) an electrical interface 658 with an electrical coupling 659. Transmitter controls 655 can include: (a) a display 557; and (b) one or more buttons 556. Transmitter module 551 can be electrically and mechanically coupled to base module 110. Transmitter module 551 is removably or permanently coupled to base module 110 during the manufacturing process. In some embodiments, antenna matching circuit 652 and antenna 553 can part of base module 510. In other embodiments, antenna matching circuit 652 and antenna 553 can part of transmitter module 551.

Electrical interface 658 can include electrical coupling 659 and the electronic circuitry (if any) necessary to electrically couple to and communicate with electrical interface 227. In some examples, electrical couplings 228 and 659 can be complementary coupling. In one embodiment, electrical couplings 228 and 659 can be complementary proprietary couplings. In other embodiment, electrical couplings 228 and 659 can be complementary universal serial bus connectors.

Transmitter 654 can be configured to transmit data over the at least one radio frequency using antenna 553. Transmitter 654 can be electrically coupled to electrical interface 217 (via electrical interfaces 658 and 227) and configured to transmit data signals (e.g., audio signals) received from electrical device 190 (FIG. 1) via electrical interface 217. In many examples, transmitter 654 includes a radio frequency transmitter. Transmitter 654 can be coupled to antenna 553 through antenna matching circuit 652.

In some examples, the set of radio frequencies can include the full FM band. In the United States (US), the FM band includes the frequencies or channels between 87.5 MHz (megahertz) and 108 MHz. In Japan, the FM band includes frequencies between 76 MHz and 90 MHz. In Europe, the FM band includes frequencies between 87.6 MHz and 107.9 MHz. In other countries, the full FM band can scan other ranges of radio frequencies. In further embodiments, the set of radio frequencies include other carrier frequency sets or bands (e.g. the AM (amplitude modulated) band, the VHF (very high frequency) band, and/or the UHF (ultra high frequency) band).

To comply with FCC (Federal Communications Commission) requirements, the output of transmitter 654 (an electrical signal) is coupled to an attenuation circuit (not shown). The amount of attenuation that is needed to comply with FCC requirements is dictated by the output of the particular transmitter, the quality and type of antenna that is being utilized, and the environment in which the transmitter is being used. Consequently, the specific design of the attenuation circuit is a matter of design choice depending upon the needs of the particular application. For some types of electrical signals to be broadcast by transmitter 654, an attenuation circuit will not be needed. In some embodiments, the attenuation circuit can be a portion of antenna matching circuit 652.

In some examples, one or more of buttons 556 can be semi-permanently set to select a radio frequency (i.e. a transmission frequency) for transmitter 654 to transmit the data signal to a receiving device (not shown). In the same examples, one or more of buttons 556 can be semi-permanently set to select an audio mode (e.g., AM or FM) for the data signals. One or more of buttons 556 can be semi-permanently set to select a radio frequency for transmitter 654 from a memory (not shown) within base module 110 or transmitter module 551. As an example, the memory can be part of microprocessor 220, which can be referred to as a microcontroller in some embodiments. One or more of buttons 556 can be used to scan for an open radio frequency for transmitter 654.

Display 557 can be used to display information about the selected transmission frequency or audio mode. For example, display 557 can display the carrier frequency in the format "XXX.X." In the same or different example, display 557 can either display a predetermined name for an audio mode (e.g., "SPOKEN WORD MODE") or a list of settings (e.g., "Dynamic Compressor On" and/or "Output Mode: Stereo"). In some embodiments, display 557 can show the transmission frequency and audio mode information simultaneously. In other embodiments, the information shown on display 557 is related to the last pressed button of buttons 556 or predetermined default information. In many examples, display 557 is an LCD (liquid crystal display). In other examples, display 557 can be a touch screen.

Figure 7:
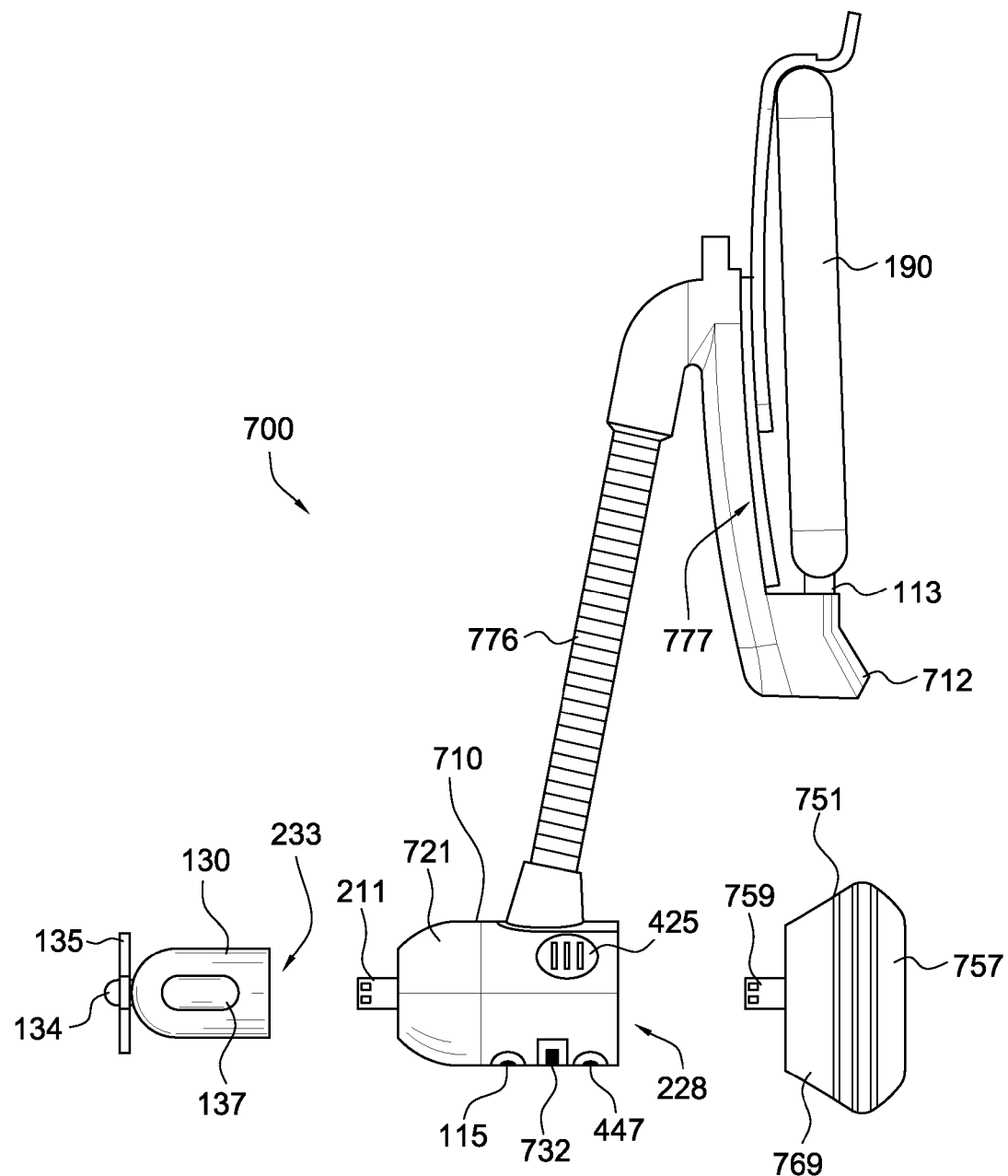
FIG. 7 illustrates a partially exploded side view of a connectivity device, according to a fourth embodiment.
Figure 8:
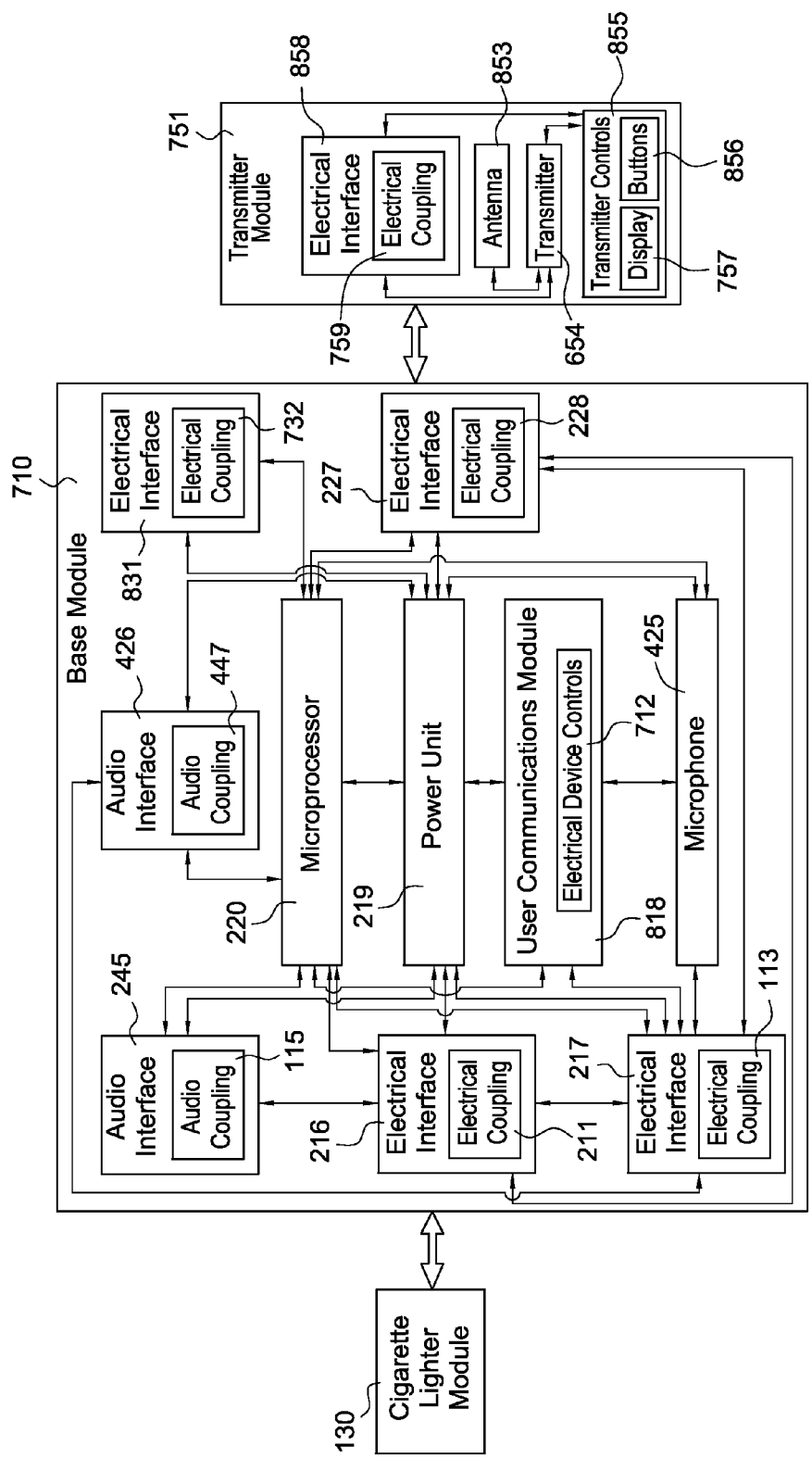
FIG. 8 illustrates a block diagram of the connectivity device of FIG. 7, according to the fourth embodiment.

Turning to yet another embodiment, FIG. 7 illustrates a partially exploded side view of connectivity device 700, according to a fourth embodiment. FIG. 8 illustrates a block diagram of base module 710, according to the fourth embodiment. As illustrated in FIG. 7, connectivity device 700 can includes: (a) a base module 710; (b) removable cigarette lighter adapter or a removable cigarette lighter module 130; and (c) a transmitter module 751 with a body 769. Cigarette lighter module 130 is removably coupled to base module 710 similar to the removably coupleability of cigarette lighter module 130 to base module 110, 410, and 510 of FIGS. 1, 4 and 5, respectively.

Base module 710 can include; (a) electrical interface 216 (FIG. 7) with electrical coupling 211 (FIGS. 7 and 8); (b) user communications module 818 (FIG. 8) with electrical device controls 712 (FIGS. 7 and 8); (c) electrical interface 217 (FIG. 7) with electrical coupling 113 (FIGS. 7 and 8); (d) electrical interface 831 (FIG. 7) with electrical coupling 732 (FIGS. 7 and 8); (e) audio interface 245 with audio coupling 115; (f) audio interface 426 (FIG. 8) with audio coupling 447 (FIGS. 7 and 8); (g) power unit 219 (FIG. 8): (h) microprocessor 220 (FIG. 8); (i) electrical interface 227 (FIG. 8) with electrical coupling 228 (FIGS. 7 and 8); (j) a body 721 (FIG. 7); (k) microphone 425; (l) connector 776 (FIG. 7); and (m) holder 777 (FIG. 7) configured to hold or couple to electrical device 190 (FIG. 7).

Body 721 can include an interior cavity (not shown). This interior cavity can house a portion of the electronic circuitry necessary to operate base module 710. In some examples, at least a portion of electrical interface 216, user communications module 818, electrical interface 217, electrical interface 831, audio interface 245, audio interface 426, power unit 219, microprocessor 220, electrical interface 227, and microphone 425 are located in the interior cavity of body 521.

Connector 776 can be a semi-rigid elongated portion configured to allow a position of holder 777 to be semi-permanently adjusted relative to a position of base module 710. In some examples, connector 776 can include a gooseneck, which can be compliant (or obedient) flexible tubing, and is preferably metallic or metal covered with, e.g., plastic or elastic material on its outside. A gooseneck can be considered to be a coiled layered construction in which adjacent coils overlap but can be moved with respect to each other (in a sense, slide on each other). Goosenecks tends to hold the position into which it is bent (i.e., it is semi-permanently adjustable or repositionable), unless it is bent beyond its limit. The two "layers" of the gooseneck can be considered to have different thicknesses. Thus, a gooseneck has two outer diameters, the outer diameter of the thicker layer, and the outer diameter of the thinner layer, which alternate in the gooseneck. In some embodiments, connector 776 can be between 7.5 centimeters (cm) and 15.2 cm (e.g., approximately 11.4 long cm); its larger outer diameter is approximately 9 millimeters (mm); its smaller outer diameter is approximately 8.2 millimeters; its inner diameter is approximately 4.5 millimeters; the center-to-center spacing between the larger diameter portions is approximately 3.5 millimeters; the longitudinal gap between the larger diameter portions is approximately 1 millimeter; and the material of construction can be steel.

Connector 776 must not be so stiff that it cannot be readily repositioned by the user; but, it must be stiff enough to maintain holder 777 (with electrical device 190) in position with respect to base module 710 after holder 777 and connector 776 have been put into their desired position.

Connector 776 used in some embodiments are available in varying dimensions (e.g., outer diameters of 2 millimeter or less to over 16 millimeters). Connector 776 can be implemented with a design, dimensions, and materials of construction to select for any particular usage based on the desired length of connector 776, the weight of holder 777 and electrical device 190 to be held in it, whether connector 776 is to function as a broadcast antenna and, if so, for what range of radio frequencies.

As illustrated in FIG. 8, transmitter module 751 can include: (a) a transmitter 654; (b) transmitter controls 855; (c) an electrical interface 858 with an electrical coupling 759 (FIGS. 7 and 8); and (d) antenna 853. Transmitter controls 855 can include: (a) a display 757 (FIGS. 7 and 8); and (b) one or more buttons 856. Transmitter module 751 can be electrically and mechanically coupled to base module 710. Transmitter module 751 is removably or permanently coupled to base module 710 during the manufacturing process.

Electrical interface 831 can include electrical coupling 732 and the electronic circuitry (if any) necessary to electrically couple to and communicate with a second electrical device (not shown). In some examples, electrical coupling 732 can be configured to provide electrical power to the second electrical device. In other examples, electrical coupling 732 is configured to receive electrical power from the second electrical device. In other embodiments, electrical coupling 732 is configured to receive and/or send electrical power to the second electrical device. In still additional embodiments, electrical coupling 732 is configured to send and/or receive data signals and/or power signals from the second electrical device. In some examples, electrical coupling 732 can be a universal serial bus connector.

Figure 9:
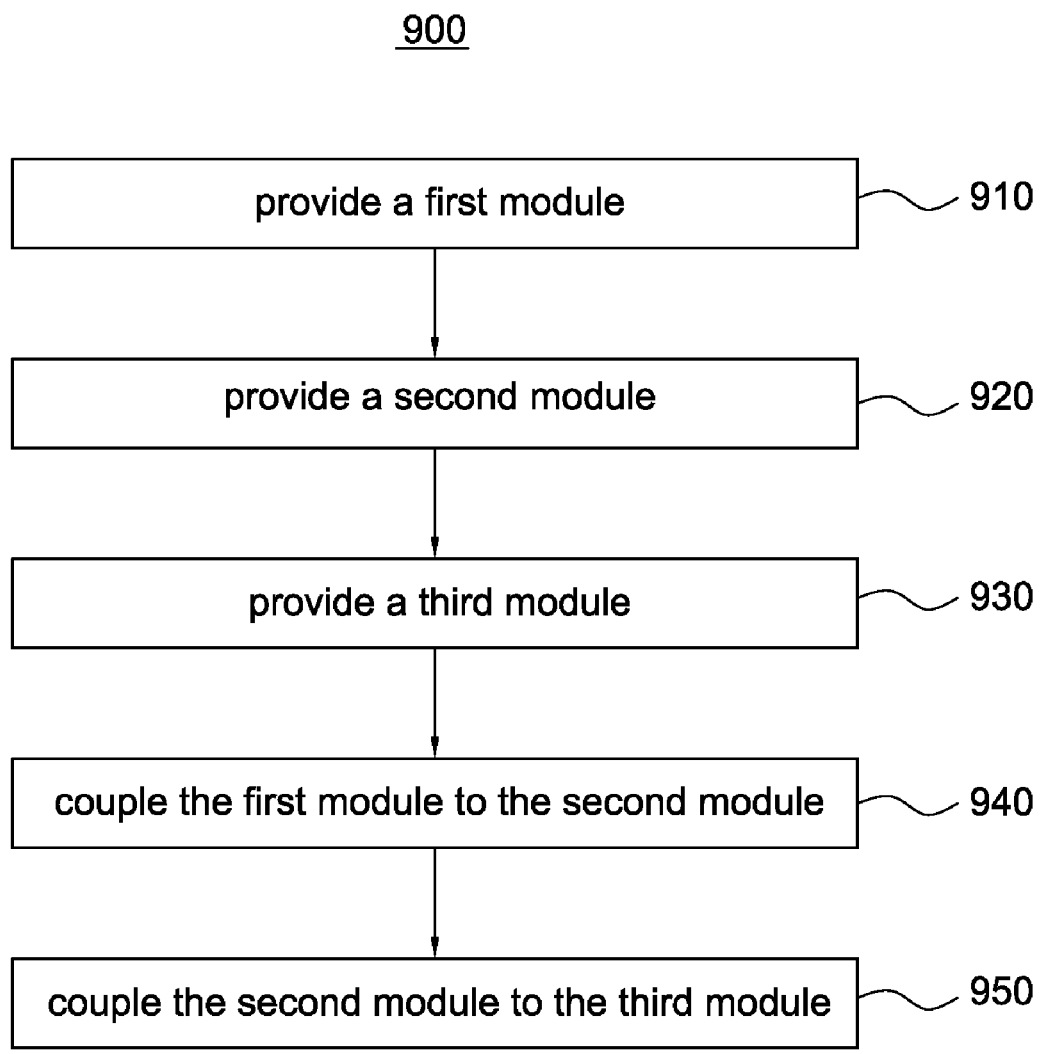
FIG. 9 illustrates a flow chart of a method of providing a connectivity device for interfacing with an electrical device, according to the first embodiment.

FIG. 9 illustrates a flow chart of a method 900 of providing a connectivity device for interfacing with an electrical device, according to the first embodiment. As an example, the connectivity device can be similar or identical to connectivity devices 100, 400, 500, or 700 of FIGS. 1, 4, 5, and 7, respectively. As an example, the electrical device can be similar or identical to electrical device 190 of FIG. 1.

Figure 10:
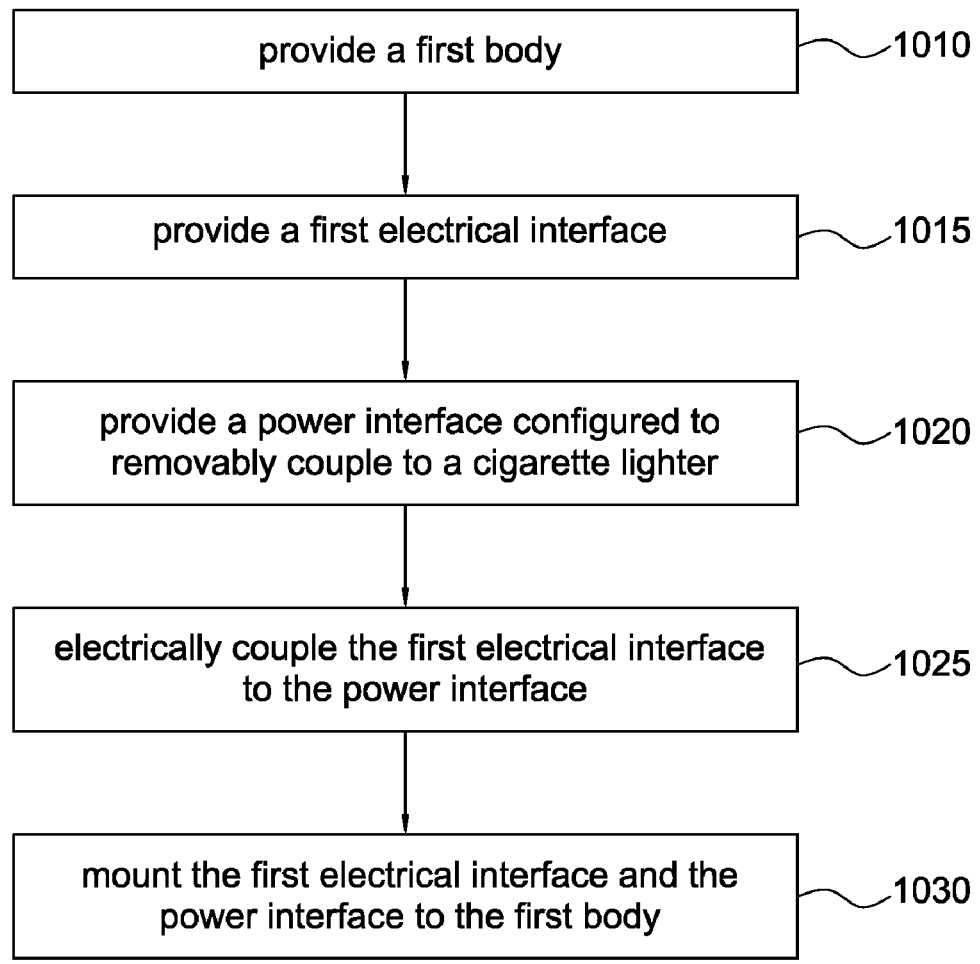
FIG. 10 illustrates a flow chart of an example of activity of providing a first module, according to the first embodiment.

Method 900 in FIG. 9 can include an activity 910 of providing a first module. As an example, the first module can be similar or identical to cigarette lighter module 130 (FIG. 1). FIG. 10 illustrates a flow chart of an example of activity 910, according to the first embodiment.

Activity 910 in FIG. 10 can include a procedure 1010 of providing a first body or housing. As an example, the first body can be similar or identical to body 138 of FIG. 1.

Activity 910 in FIG. 10 can continue with a procedure 1015 of providing a first electrical interface. As an example, the electrical interface can be similar or identical to electrical interface 249 of FIG. 2.

Subsequently, activity 910 in FIG. 10 can include a procedure 1020 of providing a power interface configured to removably couple to a cigarette lighter. As an example, the power interface can be similar or identical to electrical interface 248 of FIG. 2.

Next, activity 910 in FIG. 10 can include a procedure 1025 of electrically coupling the first electrical interface to the power interface. As an example, the first electrical interface can be coupled to the power interface identically or similarly to the coupling of electrical interface 249 with electrical interface 248, as illustrated in FIG. 2.

Activity 910 in FIG. 10 can continue with a procedure 1030 of mounting the first electrical interface and the power interface to the first body. As an example, the first electrical interface and the power interface can be mounted in an interior cavity of the first body identically or similarly to the mounting of electrical interface 249 with electrical interface 248 in body 138, as illustrated in FIGS. 1 and 3. After procedure 1030, activity 910 is complete.

Figure 11:
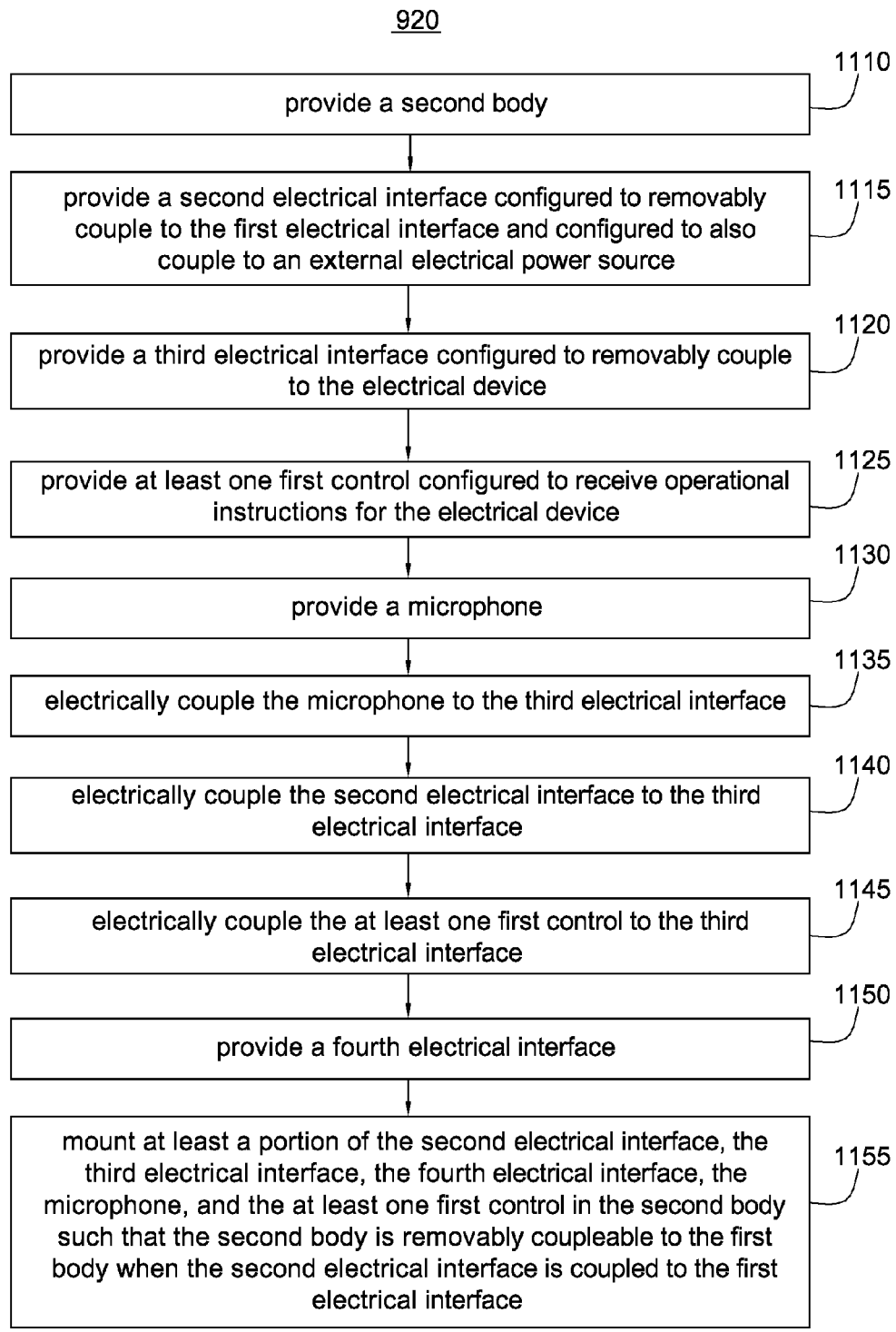
FIG. 11 illustrates a flow chart of an example of activity of providing a second module, according to the first embodiment.

Referring again to FIG. 9, method 900 in FIG. 9 can include an activity 920 of providing a second module. As an example, the second module can be similar or identical to base module 110, 410, 510, or 710 of FIGS. 1, 4, 5, and 7, respectively. FIG. 11 illustrates a flow chart of an example of activity 920, according to the first embodiment.

Referring to FIG. 11, activity 920 can include a procedure 1110 of providing a second body or housing. As an example, the second body can be similar or identical to body 121, 421, 521, or 721 of FIGS. 1, 4, 5, and 7, respectively. Next, activity 920 in FIG. 11 can include a procedure 1115 of providing a second electrical interface configured to removably couple to the first electrical interface and configured to also couple to an external electrical power source. As an example, the second electrical interface can be similar or identical electrical interface 216 of FIG. 2.

Activity 920 in FIG. 11 can continue with a procedure 1120 of providing a third electrical interface configured to removably couple to the electrical device. As an example, the third electrical interface can be similar or identical to electrical interface 217 of FIG. 2.

Subsequently, activity 920 in FIG. 11 can include a procedure 1125 of providing at least one first control configured to receive operational instructions for the electrical device. As an example, the at least one first control can be similar or identical to electrical device controls 112 of FIG. 1.

Next, activity 920 in FIG. 11 can include a procedure 1130 of providing a microphone. As an example, the microphone can be similar or identical to microphone 425 of FIG. 4.

Activity 920 in FIG. 11 can continue with a procedure 1135 of electrically coupling the microphone to the third electrical interface. As an example, the microphone can be electrically coupled to the third electrical interface identically or similarly to the electrical coupling of microphone 425 to electrical interface 217, as illustrated in FIG. 6.

Subsequently, activity 920 in FIG. 11 can include a procedure 1140 of electrically coupling the second electrical interface to the third electrical interface. As an example, the second electrical interface can be electrically coupled to the third electrical interface identically or similarly to the electrical coupling of electrical interface 216 to electrical interface 217, as illustrated in FIG. 1.

Next, activity 920 in FIG. 11 can include a procedure 1145 of electrically coupling the at least one first control to the third electrical interface. As an example, the at least one first control can be electrically coupled to the third electrical interface identically or similarly to the coupling of user communications module 218 to electrical interface 217, as illustrated in FIG. 2.

Subsequently, activity 920 in FIG. 11 can include a procedure 1150 of providing a fourth electrical interface. As an example, the fourth electrical interface can be similar or identical to electrical interface 227 of FIG. 2.

Activity 920 in FIG. 11 can continue with a procedure 1155 of mounting at least a portion of the second electrical interface, the third electrical interface, fourth electrical interface, the microphone, and the at least one first control in the second body such that the second body is removably coupleable to the first body when the second electrical interface is coupled to the first electrical interface.

Figure 12:
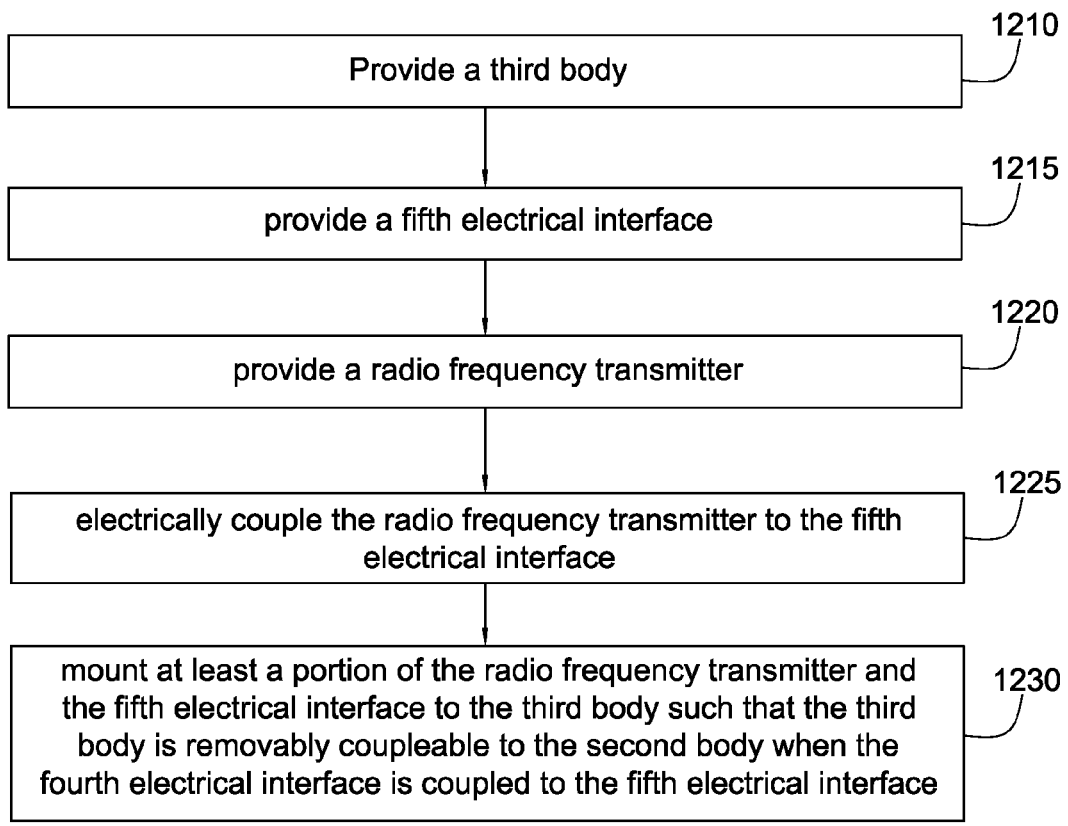
FIG. 12 illustrates a flow chart of an example of activity of providing a third module, according to the first embodiment.

Referring again to FIG. 9, method 900 in FIG. 9 continues with an activity 930 of providing a third module. As an example, the third module can be similar or identical to cap 160 of FIG. 1 or transmitter module 551 or 751 of FIGS. 5 and 7, respectively. FIG. 12 illustrates a flow chart of an example of activity 930, according to the first embodiment.

Referring to FIG. 12, activity 930 includes a procedure 1210 of providing a third body or housing. As an example, the third body can be similar or identical to body 569 or 769 of FIGS. 5 and 7, respectively.

Subsequently, activity 930 in FIG. 12 includes a procedure 1215 of providing a fifth electrical interface. As an example, the fifth electrical interface can be similar or identical to electrical interface 658 or 858 of FIGS. 5 and 8, respectively.

Next, activity 930 in FIG. 12 includes a procedure 1220 of providing a radio frequency transmitter. As an example, the radio frequency transmitter can be similar or identical to transmitter 654 of FIG. 5.

Activity 930 in FIG. 12 continues with a procedure 1225 of electrically coupling the radio frequency transmitter to the fifth electrical interface. The coupling of the radio frequency transmitter to the fifth electrical interface can be identical or similar to the electrical coupling of electrical interface 658 or 858 with transmitter 654, as illustrated in FIGS. 5, 6 and 8.

Subsequently, activity 930 in FIG. 12 includes a procedure 1230 of mounting at least a portion of the radio frequency transmitter and the fifth electrical interface to the third body such that the third body is removably coupleable to the second body when the fourth electrical interface is coupled to the fifth electrical interface.

Referring again to FIG. 9, method 900 in FIG. 9 can include an activity 940 of coupling the first module to the second module. In some examples, the coupling the first module to the second module can be similar to the coupling of cigarette lighter module 130 with base module 110 in FIG. 1.

Method 900 in FIG. 9 can continue with an activity 950 of coupling the second module to the third module.

The order of the activities and procedures of method 900 can vary and are not necessarily performed in the order shown in FIGS. 9-12. For example, activity 910 (FIG. 9) can occur after or simultaneously with activity 920 (FIG. 9). In another example, procedure 1150 (FIG. 11) can occur before or simultaneously with procedures 1110-1145. Other variations also exist.

Although the invention has been described with reference to specific embodiments, it will be understood by those skilled in the art that various changes may be made without departing from the spirit or scope of the invention. For example, it will be readily apparent transmitter module 551 (FIG. 6) can include microphone 425 (FIG. 6). Additional examples of such changes have been given in the foregoing description. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the connecting devices and methods of providing discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A connectivity device configured to provide electrical power to a first electrical device and facilitate communications between the first electrical device and at least one second electrical device, the connectivity device further configured to couple to a cigarette lighter and an external electrical power source, the connectivity device comprising:
   a first removable cigarette lighter adapter comprising:
      a first electrical output interface; and
      a power interface configured to removably couple to the cigarette lighter;
   a base module comprising:
      at least one first interface;
      a second interface configured to removably couple to the first electrical output interface of the first removable cigarette lighter adapter and configured to also removably couple to the external electrical power source;
      a third interface configured to removably couple to the first electrical device; and
      a first control configured to receive operational instructions for the first electrical device,
   wherein:
      the base module is configured to provide the operational instructions and the electrical power to the first electrical device through the third interface.

2. The connectivity device of claim 1, further comprising:
   a wireless transmitter module removably coupled to the base module; and
   an antenna electrically coupled to the wireless transmitter.

3. The connectivity device of claim 2, wherein:
   the wireless transmitter module comprises:
      a transmitter; and
      a display electrically coupled to the transmitter and configured to display information related to the transmitter.

4. The connectivity device of claim 1, wherein:
   the base module further comprises:
      a microphone electrically coupled to the third interface and configured to provide data signals to the first electrical device through the third interface.

5. The connectivity device of claim 1, wherein:
   the second interface of the base module comprises a universal serial bus connector.

6. The connectivity device of claim 5, wherein:
   the first electrical output interface of the first removable cigarette lighter adapter compromises a universal serial bus connector.

7. The connectivity device of claim 1, further comprising:
   a second removable cigarette lighter adapter comprising:
      a first electrical output interface configured to removably couple to the second interface of the base module; and
      a power interface configured to removably couple to the cigarette lighter to receive a second electrical current,
   wherein:
      the power interface of the first removable cigarette lighter is configured to receive a first electrical current; and
      the second electrical current is different than the first electrical current.

8. An electrical accessory configured to transmit first data signals and electrical power to a first electrical device, the electrical accessory comprising:
   a cigarette lighter module comprising:
      a first universal serial bus connector;
      a power receiving interface configured to couple to a cigarette lighter and receive the electrical power from the cigarette lighter; and
      at least one second universal serial bus connector; and
   a base module removably coupleable to the cigarette lighter module and comprising:
      a universal serial bus connector configured to couple to the first universal serial bus connector of the cigarette lighter module;

a first electrical interface configured to couple to the first electrical device;

at least one second electrical interface;

a first microphone electrically coupled to the first electrical interface and configured to receive sounds and convert the sounds into the first data signals; and electrical device controls for at least partially operating the first electrical device, wherein:

the base module is configured to provide the electrical power to the first electrical device that the base module receives from the cigarette lighter module when the first universal serial bus connector of the cigarette lighter module is coupled to the universal serial bus connector of the base module, when the power receiving interface of the cigarette lighter module is coupled to the cigarette lighter, and when the first electrical interface of the base module is coupled to the first electrical device; and the base module is further configured to provide the electrical power to the first electrical device that the base module receives from an external electrical power source when the universal serial bus connector of the base module is coupled to the external electrical power source.

9. The electrical accessory of claim 8 further comprising:

a transmittal module removably coupleable to the base module, the transmitter module comprises:

a removable radio frequency transmitter configured to wirelessly provide second data signals to a receiving device, wherein:

the base module is further configured to receive the second data signals from the first electrical device.

10. The electrical accessory of claim 8, further comprising:

a body enclosing at least a portion of the base module.

11. The electrical accessory of claim 10, wherein:

the universal serial bus connector of the base module is mechanically coupled to the body.

12. The electrical accessory of claim 10, wherein:

the base module further comprises:

a wire with a first end and a second end; and the first end of the wire is mechanically coupled to the body; and the second end of the wire is mechanically coupled to the universal serial bus connector of the base module.

13. The electrical accessory of claim 8, wherein:

the base module is further configured to receive second data signals from the first electrical device; and the at least one second electrical interface comprises:

a TRS connector configure to provide the second data signals to a receiving device;

a power interface configured to provide second electrical power to a third electrical device.

14. The electrical accessory of claim 8, wherein:

the first electrical interface comprises a thirty-pin connector.

15. A method of providing a connectivity device for interfacing with an electrical device, the method comprising:

providing a first body;

providing a first electrical interface;

providing a power interface configured to removably couple to a cigarette lighter;

electrically coupling the first electrical interface to the power interface;

mounting the first electrical interface and the power interface to the first body;

providing a second body;

providing a second electrical interface configured to removably couple to the first electrical interface and configured to also removably couple to an external electrical power source;

providing a third electrical interface configured to removably couple to the electrical device; providing a first control configured to receive operational instructions for the electrical device;

providing a fourth electrical interface;

electrically coupling the second electrical interface to the third electrical interface;

electrically coupling the fourth electrical interface to the third electrical interface;

electrically coupling the first control to the third electrical interface; and mounting the second electrical interface, the third electrical interface, and the first control to the second body such that the second body is removably coupleable to the first body when the second electrical interface is coupled to the first electrical interface.

16. The method of claim 15, further comprising:

providing a fourth electrical interface;

mounting the fourth electrical interface to the second body;

providing a third body;

providing a fifth electrical interface;

providing a radio frequency transmitter;

electrically coupling the radio frequency transmitter to the fifth electrical interface; and mounting the radio frequency transmitter and the fifth electrical interface to the third body such that the third body is removably coupleable to the second body when the fourth electrical interface is coupled to the fifth electrical interface.

17. The method of claim 15, further comprising:

providing a microphone;

electrically coupling the microphone to the third electrical interface; and mounting the microphone to the second body.

* * * * *